(12) United States Patent
Lamour et al.

(10) Patent No.: US 11,803,427 B2
(45) Date of Patent: Oct. 31, 2023

(54) METHOD OF CONTENTIONS MITIGATION FOR AN OPERATIONAL APPLICATION, ASSOCIATED COMPUTER PROGRAM PRODUCT AND METHOD FOR DETERMINING A STRESS APPLICATION

(71) Applicant: THALES, Courbevoie (FR)

(72) Inventors: Pierrick Lamour, Merignac (FR); Marc Fumey, Toulouse (FR)

(73) Assignee: THALES, Courbevoie (FR)

( * ) Notice: Subject to any disclaimer, the term of this patent is extended or adjusted under 35 U.S.C. 154(b) by 280 days.

(21) Appl. No.: 17/318,777

(22) Filed: May 12, 2021

(65) Prior Publication Data
US 2021/0357273 A1 Nov. 18, 2021

(30) Foreign Application Priority Data
May 13, 2020 (FR) .................. 20 04691

(51) Int. Cl.
*G06F 9/46* (2006.01)
*G06F 9/52* (2006.01)
(52) U.S. Cl.
CPC .................. *G06F 9/526* (2013.01)
(58) Field of Classification Search
CPC ........................................ G06F 9/526
See application file for complete search history.

(56) References Cited

U.S. PATENT DOCUMENTS
2020/0104267 A1  4/2020 Lamour et al.

FOREIGN PATENT DOCUMENTS
CN 109542831 A 3/2019
EP 3599552 A1 1/2020

OTHER PUBLICATIONS

French Search Report from French Patent Office in counterpart French Application No. FR 20 4691 dated Jan. 27, 2021.

*Primary Examiner* — Gregory A Kessler
(74) *Attorney, Agent, or Firm* — ArentFox Schiff LLP

(57) ABSTRACT

The present invention relates to a method of contentions mitigation for an operational application implemented by an embedded platform comprising a plurality of cores and a plurality of shared resources.
This method comprises the steps of executing the operational application by one of the cores of the embedded platform, executing a stressor application on at least some other cores of the embedded platform in parallel with the operational application, the stressor application being composed of a set of contention tasks generating a maximum contention on interference channels, and determining contentions generated by the stressor application on the operational application.

6 Claims, 2 Drawing Sheets

METHOD OF CONTENTIONS MITIGATION FOR AN OPERATIONAL APPLICATION, ASSOCIATED COMPUTER PROGRAM PRODUCT AND METHOD FOR DETERMINING A STRESS APPLICATION

CROSS-REFERENCE TO RELATED APPLICATIONS

This application claims priority to French Application No. 20 04691, filed on May 13, 2020. The disclosure of the priority application is incorporated in its entirety herein by reference.

FIELD OF THE INVENTION

The present invention relates to a method of contentions mitigation for an operational application.

The present invention also relates to a computer program product and a method for determining a stressor application associated with such a mitigation method.

The invention is particularly applicable in the field of multi-master embedded platforms, such as embedded platforms usable in the avionics field.

BACKGROUND OF THE INVENTION

In a manner known per se, such a multi-master platform comprises a plurality of cores and a plurality of shared resources, each core being capable of executing at least one application using one or more shared resources.

In this type of platform, the use of shared resources can lead to conflicts related to concurrent access by different cores. These conflicts generally result in uncontrolled operational run times. This makes it impossible to predict the platform's operation in a deterministic way, which makes it unusable in domains where operational reliability is important.

In a mono-master platform, this problem is quite easily solved, since all accesses are sequential, and temporal scheduling solutions can be implemented to strongly reduce or eliminate conflicts.

On the other hand, in a multi-master context, there is no simple solution to the parallelism that can generate conflicts. Numerous methods already exist in the state of the art to alleviate this problem, without however reducing or eliminating conflicts in all circumstances.

Thus, for example, there are acceleration mechanisms that can increase the performance of one or more cores of a multi-core platform, including buses and peripherals. However, these mechanisms can only hide the issues of contention, given the physical limits (size, performance, etc.) of these components. Indeed, depending on the application and in case of overflow, the problems reappear.

Particular core architectures also make it possible to limit contentions but, as in the preceding case, they also have their physical limits.

SUMMARY OF THE INVENTION

The use of multi-master architectures thus poses a major problem a priori in its use in a high criticality context where determinism is essential.

The purpose of the present invention is to solve these problems, that is, to propose mechanisms for resolving contentions in a multi-core platform that make it possible to make the operation of such a platform deterministic, without over-dimensioning various physical components of the latter.

To this end, the object of the invention is a method of contentions mitigation for an operational application implemented by an embedded platform.

The embedded platform comprises a plurality of cores and a plurality of shared resources, each core being capable of executing at least one application by using one or more shared resources via an access channel established between this core and the corresponding shared resource, allowing the use of this shared resource.

The mitigation method comprises the following steps:
executing the operational application by one of the cores of the embedded platform;
executing a stressor application on at least some other cores of the embedded platform in parallel with the operational application, the stressor application being composed of a set of contention tasks, each contention task generating a maximum contention on an interference channel, the or each interference channel having a portion shared between several channels accessing a same shared resource;
determining contentions generated by the stressor application on the operational application.

According to other advantageous aspects of the invention, the mitigation method comprises one or more of the following features, taken alone or in any technically possible combination:
the stressor application is executed on each available core;
the stressor application is executed on each core defining an interference channel with the core executing the operational application;
the operational application is executed according to its final deployment context;
the method comprises a step of measuring determined contentions.

The invention also relates to a computer program product comprising software instructions that implement a mitigation method as defined above, when executed by a computer.

It is also an object of the invention to provide a method for determining a stressor application for contentions mitigation in an embedded platform, the embedded platform comprising a plurality of cores and a plurality of shared resources, each core being capable of executing at least one application using one or more shared resources via an access channel established between that core and the corresponding shared resource allowing the use of that shared resource.

The determination method comprises the following steps:
determining interference channels in the embedded platform, each interference channel having a portion shared between several access channels to the same shared resource;
for each interference channel, determining a contention task that generates maximum contention on that interference channel; and
determining the stressor application by the set of generated contention tasks.

According to further advantageous aspects of the invention, the determination method comprises one or more of the following features, taken alone or in any technically possible combination:
each contention task is determined in accordance with the usage domain of the embedded platform;
each interference channel is determined according to the architecture of the embedded platform;

each contention task is determined according to the characteristics of the corresponding interference channel.

BRIEF DESCRIPTION OF THE DRAWINGS

These features and advantages of the invention will become apparent from the following description, given only as a non-limiting example, and made with reference to the attached drawings, in which.

DETAILED DESCRIPTION OF THE INVENTION

Figure 1:
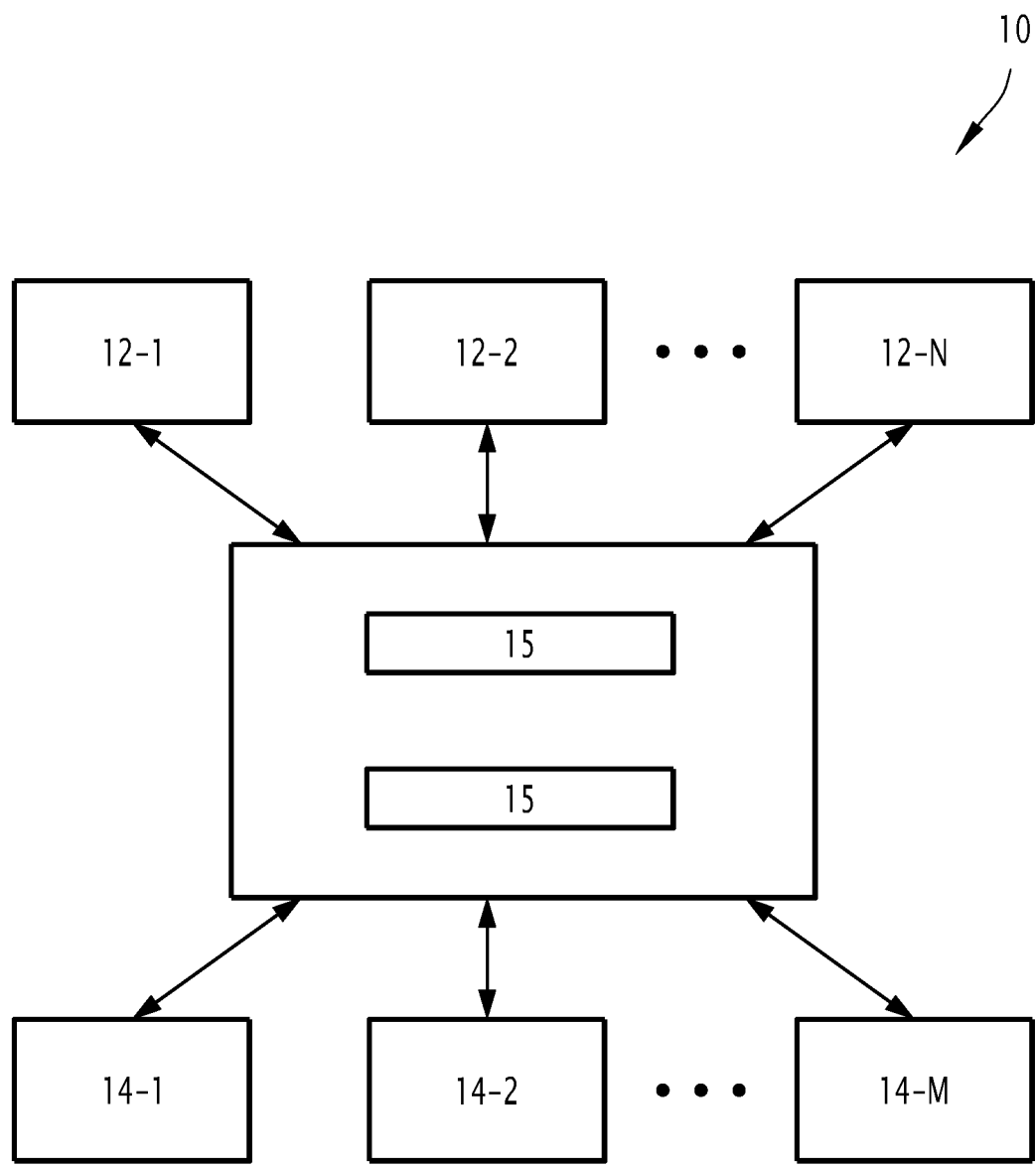
FIG. 1 is a schematic view of an on-board platform for which a contention mitigation method according to the invention is applied.

In fact, an example of an embedded platform 10 is illustrated in FIG. 1.

Such an embedded platform 10 has, for example, a critical system, in particular an avionics critical system. In the latter case, the embedded platform 10 is thus configured to perform one or more avionics tasks.

In all cases, the embedded platform 10 is designed to operate in a particular domain of use. This domain therefore defines the architecture of this platform as well as at least some operating features of the components of this platform. In this case, the operation of the platform 10 corresponds to its nominal operation.

With reference to FIG. 1, the embedded platform comprises N cores 12-1, . . . , 12-N, M shared resources 14-1, . . . , 14-M and one or more arbitration levels 15 between the cores and the resources, the numbers M and N being strictly greater than 1.

Each core 12-1, . . . , 12-N, which may also be referred to as processor or master, is known per se. In particular, each core 12-1, . . . , 12-N is capable of executing an application using one or more shared resources 14-1, . . . , 14-M.

To do so, each core 12-1, . . . , 12-N is capable of sending requests, for example, to at least some of the shared resources 14-1, . . . , 14-M and to receive responses to these requests.

In the following, the applications executed by the cores 12-1, . . . , 12-N, in the case of nominal operation of the platform, will be referred to as operational applications. For example, when the platform 10 shows an avionics system, the operational applications show applications configured to implement different avionics tasks performed by such a system.

Each shared resource 14-1, . . . , 14-M has a hardware and/or possibly software component, enabling cores 12-1, . . . , 12-N to execute the applications.

By way of example, these shared resources 14-1, . . . , 14-M include storage space, RAM, and/or any other device known per se.

Furthermore, each shared resource 14-1, . . . , 14-M is defined by at least one characteristic of its operation. Such a feature may relate, for example, to a data processing capability of the corresponding resource, such as, for example, its write speed, read speed, assured throughput, buffer size, etc.

Each core 12-1, . . . , 12-N is capable of using one or more shared resources 14-1, . . . , 14-M via one or more arbitration levels 15, known per se.

In particular, each arbitration level 15 is, for example, in the form of one or more access buses for controlling the access rights of each core 12-1, . . . , 12-N to each resource 14-1, . . . , 14-M.

In FIG. 1, two arbitration levels are illustrated.

Like the resources, each arbitration level 15 is also defined by one or more characteristics, such as transmission speed, throughput, etc.

Thus, the arbitration levels 15 make it possible to define access channels from the cores 12-1, . . . , 12-N to the resources 14-1, . . . , 14-N.

In particular, by "access channel", we mean an association of a core 12-1, . . . , 12-N and a shared resource 14-1, . . . , 14-M, making this resource usable by this core.

Thus, an access channel can for example present a data communication channel between the core and the corresponding resource, this data being usable to execute an application by the core.

The access channels are defined by the architecture of the platform 10, at the design stage thereof.

Figure 2:
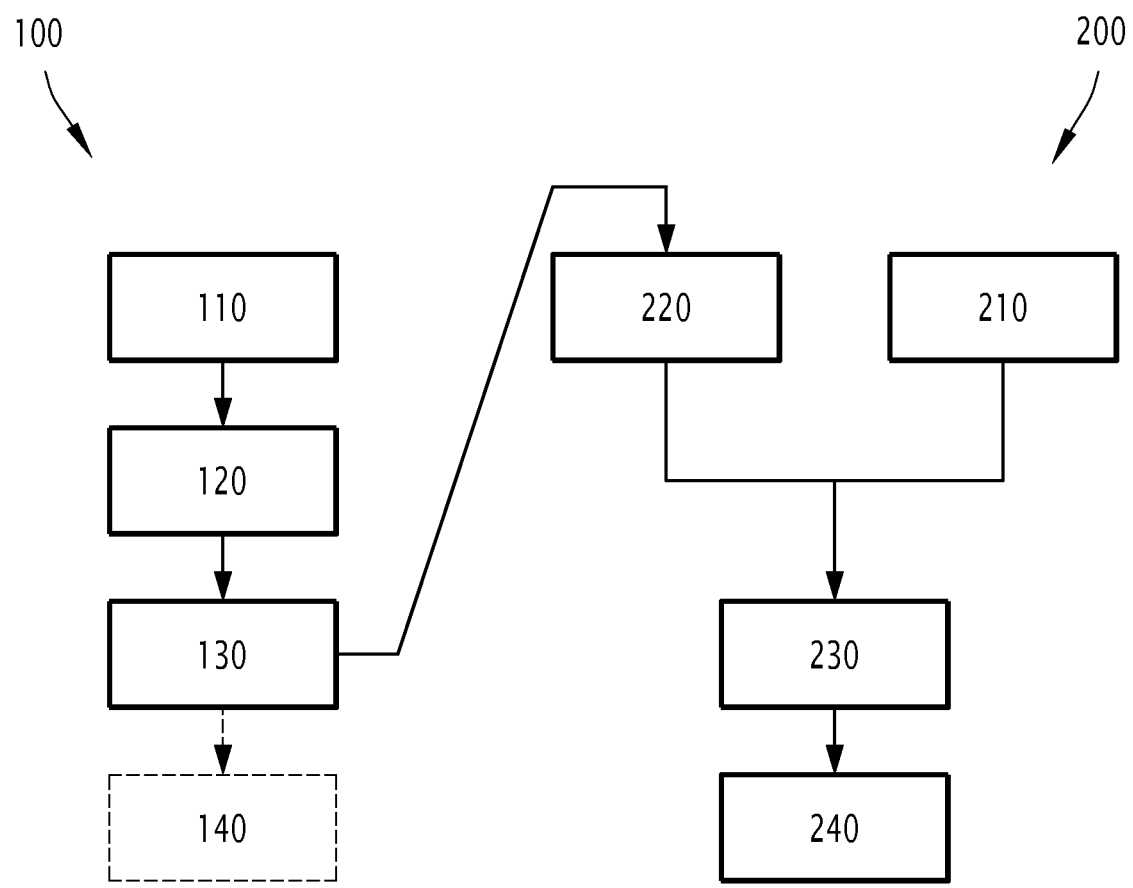
FIG. 2 is a flowchart of the mitigation and determination methods of a stressor application according to the invention.

The determination method 100 of a stressor application usable for a contentions mitigation in the platform 10 will now be explained with reference to FIG. 2 showing in its left part a flowchart of this method.

This determination method 100 is, for example, implemented prior to the nominal use of the platform 10 but after the design of the platform 10. In other words, when the determination method 100 is implemented, the architecture of the platform 10 as well as the features of all of its components are already known.

According to another embodiment, this method 100 is implemented before the final architecture of the platform 10 is chosen. In such a case, this method can be implemented several times in order to best determine such a final architecture. Thus, for example, for the different iterations of the method, different architectures and possibly different characteristics of its components may be used. The architecture retained after these iterations will be, for example, the one that presents the best performance in the worst case or the best control of the interference channels.

During an initial step 110 of this method 100, all the interference channels are determined.

In particular, "interference channel" is understood as a portion common to several access channels to a shared resource making it possible for one core to influence another in the execution of operational applications.

Thus, for example, two access channels to the same resource 14-1, . . . , 14-N from two different cores 12-1, . . . , 12-N passing through the same arbitration level 15 form such an interference channel.

According to another example, two accesses to a resource 14-1, . . . , 14-N through a channel from two different cores passing through the same arbitration level also form an interference channel.

This step 110 is for example implemented by analyzing a model reproducing the architecture of the embedded platform 10. This analysis is supported by analysis software designed for this purpose.

In a subsequent step 120, for each interference channel, a contention task generating a maximum contention for this interference channel is generated.

To do this, for example, software designed for this purpose analyzes the characteristics of all the components forming the corresponding interference channel.

Thus, each contention task is designed to generate a maximum number of contentions in the usage domain of the platform 10.

For example, when an interference channel presents a data communication channel to a shared memory, the contention task generated for that channel could consist of a deterministic transmission of data using entirely the bandwidth of that channel.

In a subsequent step 130, a stressor application is determined by the set of contention tasks generated in step 120.

Alternatively, multiple stressor applications may be determined in this step by different groups of contention tasks. These groups are, for example, determined based on predetermined criteria. Thus, for example, a group may consist of all of the contention tasks generated for the interference channels related to the same core or resource.

Then, in an optional step 140, the resulting stressor application is verified and tested, for example by a test software designed for this purpose. These tests may include measurements of effective contentions generated by this application during its execution, for example, for at least some of the cores 12-1, . . . , 12-N.

In addition, for each resource 14-1, . . . , 14-N, a chart showing the rate of contention according to its usage rate may be generated.

The mitigation method 200 using one or more stressor applications as determined by the determination method 100 will now be explained with reference to FIG. 2 showing a flowchart of this method on its right-hand side.

This mitigation method 200 is implemented in relation to each operational application to be deployed on the platform 10. In other words, when several operational applications are to be deployed on the platform, the mitigation method 200 is implemented for each of them consecutively.

In addition, this method is, for example, implemented by purpose-built contention mitigation software or by a contention mitigation system external to the platform 10.

In an initial step 210 of this method 200, the corresponding operational application is executed by one of the cores 12-1, . . . , 12-N.

Advantageously, this execution is performed in the final temporal and spatial deployment context of the operational application. In other words, this operational application is executed using the same execution parameters as in the case of nominal operation of the platform 10.

In step 220, implemented in parallel with step 210, the stressor application is executed on at least some other cores 12-1, . . . , 12-N of the embedded platform 10.

This stressor application is executed on each available core of the platform 10, for example.

Advantageously, in this step, the stressor application is executed on each core 12-1, . . . , 12-N defining an interference channel with the core executing the operational application.

When several stressor applications have been determined by the determination method 100, only those applications sharing the same interference channel with the operational application are executed, for example. Alternatively, all stressor applications are executed.

In the next step 230, the contentions generated by the stressor application on the operational application are determined.

In the next step 240, the contentions determined in step 230 are measured.

These measurements may include, for example, measurements of the duration of each contention.

By construction of the stressor application, these measurements thus correspond to a worst-case operating mode of the operational application. These measurements can then be used to size the operational application and to predict, for example, its maximum execution time during nominal operation of the platform 10.

By implementing the contentions mitigation method 200 for each operational software to be deployed on the platform 10, the operation of the platform 10 is therefore made completely deterministic.

According to the invention, this has been achieved by implementing a stressor application that places each operational application in the worst-case operating mode independently of the other applications.

Thus, when the operational applications are simultaneously deployed on the platform during nominal operation of the platform 10, the mutual contentions generated cannot exceed the contentions measured during the implementation of the method 200. Thus, the execution time of each operational application remains fully predictable.

The invention provides an important advantage for application integration by the ability of the stressor application(s) to produce a worst-case situation. This avoids an integration phase common to all applications, which would be necessary to verify the applications in a real and worst-case context without this capability.

This also avoids over-provisioning the components of the platform 10 or modifying the core architecture to accommodate a reality that is harsher than the verification conditions of each operational application, each of which has been verified in a demonstrated worst-case context.

The invention claimed is:

1. A method of contentions mitigation for an operational application implemented by an embedded platform, the embedded platform comprising a plurality of cores and a plurality of shared resources, each core being able to execute at least one application using one or more shared resources via an access channel established between this core and the corresponding shared resource allowing the use of this shared resource;

the mitigation method comprising the following steps:
   executing the operational application by one of the cores of the embedded platform;
   executing a stressor application on at least some other cores of the embedded platform in parallel with the operational application, the stressor application being composed of a set of contention tasks, each contention task generating a maximum contention on an interference channel, the or each interference channel having a portion shared between several access channels to a same shared resource;
   determining contentions generated by the stressor application on the operational application.

2. The mitigation method according to claim 1, wherein the stressor application is executed on each available core.

3. The mitigation method according to claim 1, wherein the stressor application is executed on each core defining an interference channel with the core executing the operational application.

4. The mitigation method according to claim 1, wherein the operational application is executed according to its final deployment context.

5. The mitigation method according to claim 1, further comprising a step of measuring determined contentions.

6. A computer program product comprising software instructions that, when executed by a computer, implement a mitigation method according to claim 1.

* * * * *